US008667186B2

(12) United States Patent
Oe et al.

(10) Patent No.: US 8,667,186 B2
(45) Date of Patent: Mar. 4, 2014

(54) IO CONTROL METHOD AND PROGRAM AND COMPUTER

(75) Inventors: Kazuichi Oe, Yokohama (JP); Kazutaka Ogihara, Hachioji (JP); Yasuo Noguchi, Kawasaki (JP); Tatsuo Kumano, Kawasaki (JP); Masahisa Tamura, Kawasaki (JP); Munenori Maeda, Yokohama (JP); Ken Iizawa, Yokohama (JP); Toshihiro Ozawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/618,466

(22) Filed: Sep. 14, 2012

(65) Prior Publication Data

US 2013/0097341 A1    Apr. 18, 2013

(30) Foreign Application Priority Data

Oct. 12, 2011   (JP) .................................. 2011-224672

(51) Int. Cl.
*G06F 3/00* (2006.01)
*G06F 12/00* (2006.01)

(52) U.S. Cl.
USPC ............................................ 710/15; 711/167

(58) Field of Classification Search
USPC .................................. 710/15–19, 36; 711/167
See application file for complete search history.

(56) References Cited

U.S. PATENT DOCUMENTS

| 6,480,904 | B1 | 11/2002 | Kato et al. |
| 6,772,285 | B2 * | 8/2004 | Litvin ........................... 711/114 |
| 7,984,324 | B2 * | 7/2011 | Daud et al. .................... 714/6.1 |
| 2002/0073290 | A1 * | 6/2002 | Litvin ........................... 711/170 |
| 2002/0103969 | A1 * | 8/2002 | Koizumi et al. .............. 711/114 |
| 2009/0300283 | A1 * | 12/2009 | Kudo ............................. 711/114 |
| 2012/0265907 | A1 * | 10/2012 | Oe et al. ......................... 710/36 |

FOREIGN PATENT DOCUMENTS

| JP | 2001-043032 | 2/2001 |
| JP | 2003-140836 | 5/2003 |
| JP | 2005-524886 | 8/2005 |
| JP | 2011-243117 | 12/2011 |
| WO | WO 03/052590 A1 | 6/2003 |

* cited by examiner

*Primary Examiner* — Christopher Shin
(74) *Attorney, Agent, or Firm* — Fujitsu Patent Center

(57) ABSTRACT

The disclosed method includes obtaining a result concerning a busy rate and the number of accesses per unit time for a storage device including first and second storage areas; determining, from the result, whether an event that a first indicator value for the busy rate is reset occurs; when the event occurred, notifying a controller that makes the number of accesses for the second storage area not greater than the notified number of accesses of the first number of accesses less than the second number of accesses, which was notified immediately before; obtaining another result; updating the first indicator value based on another result; calculating the third number of accesses so that a sum of busy rates corresponding to the third number of accesses and corresponding to the designated number of accesses becomes equal to the updated first indicator value; and notifying the controller of the third number of accesses.

8 Claims, 11 Drawing Sheets

| DEVICE: | rrqm/s | wrqm/s | r/s | w/s | rsec/s | wsec/s | rkB/s | wkB/s | avgrq-sz | avgqu-sz | await | svctm | %util |
|---|---|---|---|---|---|---|---|---|---|---|---|---|---|
| hda | 0.48 | 25.35 | 0.23 | 1.69 | 11.12 | 216.38 | 5.56 | 108.19 | 118.26 | 1.38 | 714.39 | 18.48 | 3.56 |

FIG.7

IO CONTROL METHOD AND PROGRAM AND COMPUTER

CROSS-REFERENCE TO RELATED APPLICATIONS

This application is based upon and claims the benefit of priority of the prior Japanese Patent Application No. 2011-224672, filed on Oct. 12, 2011, the entire contents of which are incorporated herein by reference.

FIELD

This technique relates to an IO control method and a computer.

BACKGROUND

There have been various proposals for a method to guarantee the performance of a storage device or the like. These proposed methods use Input and Output per Second (IOPS) or throughput.

Incidentally, the busy rate of the storage device is an indicator that expresses how busy the storage device is, and for example, is calculated from the percentage of time that an IO request resides in an IO queue. Therefore, when the busy rate of the storage device is 100% ("1" in the case of using numerical values from 0 to 1), it means that it is not possible to obtain anymore performance. More specifically, when the busy rate of the storage device becomes 100%, it represents that IO requests always reside in the IO queue, and any IO is being executed, so the storage device is in a state where it would be difficult to increase the IO performance more than the present performance. IOPS, for example, is calculated from the number of accesses (the number of IOs) per unit time, which is counted in unit blocks.

Here, in case of accessing the storage device, even when trying to ensure the same IOPS, the busy rate of the storage device fluctuates and does not become the same value, when the state of the position and range on a disk of the storage device in which an IO occurs, the ratio of read and write instructions, and the distribution of the IO size change to a different state. For example, in case of considering the difference in range on the storage device in which an IO occurs, when comparing the case in which the occurrence of the IO is dominant in all of the storage areas, with the case in which the occurrence of the IO in part of the storage area is dominant, the overhead time other than for data transfer (for example, seek time) becomes greater in the former case, so even for the same IOPS, there is a tendency for the busy rate in the former case to become higher. In other words, this means that, depending on the occurrence status of the IO, it may be or may not be possible to guarantee the IO bandwidth using an indicator value such as IOPS or throughput.

In other words, there are no conventional arts to guarantee the bandwidth of the IO regardless of the occurrence status of the IO.

SUMMARY

A control method relating to one aspect of this technique includes: (A) obtaining a first monitoring result concerning a busy rate and the number of accesses per unit time with respect to a storage device including a first storage area and a second storage area; (B) determining, from the obtained first monitoring result, whether or not an event that a first indicator value for the busy rate is reset occurs; (C) upon determining that the event occurred, notifying a controller that makes the number of accesses per unit time for the second storage area equal to or less than the notified number of accesses of the first number of accesses per unit time, which is less than the second number of accesses per unit time, which was notified immediately before; (D) obtaining a second monitoring result concerning the busy rate and the number of accesses per unit time; (E) updating the first indicator value based on at least the obtained second monitoring result; (F) calculating the third number of accesses per unit time based on the obtained second monitoring result so that a sum of a busy rate corresponding to the third number of accesses per unit time and a busy rate corresponding to the designated number of accesses per unit time becomes equal to the updated first indicator value; and (G) notifying the controller of the calculated third number of accesses per unit time.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is a diagram depicting an example of a monitoring result, which is obtained from a kernel;

DESCRIPTION OF EMBODIMENTS

Embodiment 1

Figure 1:
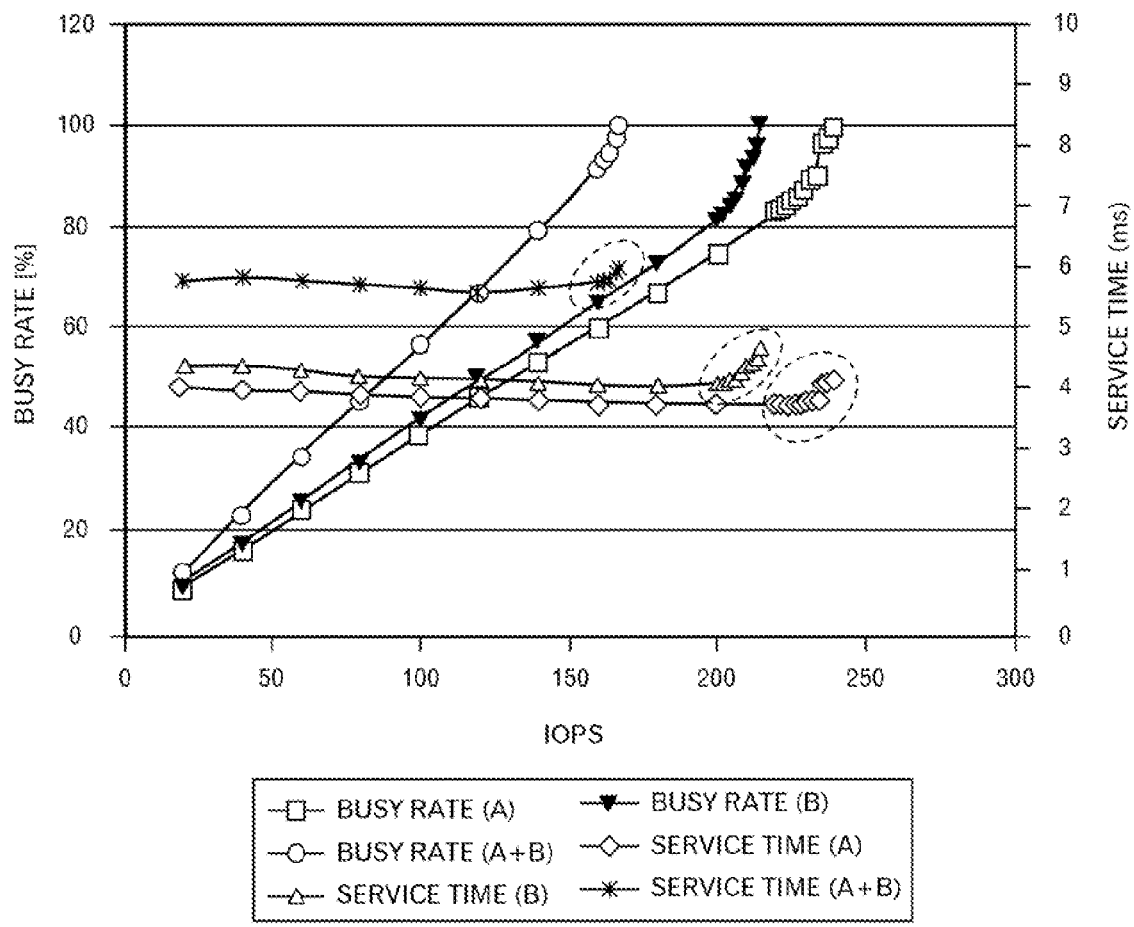
FIG. 1 is a diagram representing a difference between a relationship between IOPS and a busy rate and a relationship between IOPS and a service time.
Figure 2:
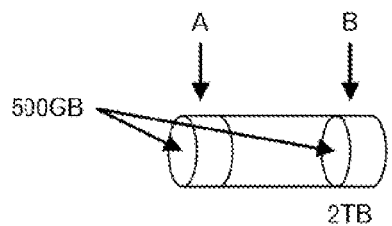
FIG. 2 is a diagram to explain a measurement condition of a measurement result depicted in FIG. 1.

As described above, the relationship between the IOPS and the IO busy rate fluctuates depending on the state (hereafter, called the workload) such as the position and range on the disk in the storage device in which the IO occurs, the ratio of read instructions and write instructions, the distribution of the IO size and the like. For example, when the relationship between the IOPS and the IO busy rate (hereafter, simply called the busy rate) is measured for a case when loaded only with a workload A, when loaded only with a workload B, and when loaded with a workload A+B, results as illustrated in FIG. 1 were obtained. As illustrated in FIG. 2, it is presumed that the IO for the workload A is carried out in a first area, and the IO for the workload B is carried out in a second area, and the first and second areas are separated and respectively have the size of 500 GBytes in one disk device (capacity 2 Tbytes). Moreover, FIG. 1 also illustrates the relationship between the service time, which is the average execution time per one IO, and the IOPS. In other words, in FIG. 1, the left vertical axis represents the busy rate (%), the right vertical axis represents the service time (ms), and the horizontal axis represents the IOPS.

In this way, for any workload, as the IOPS increases and the busy rate is near 100%, the service time rapidly increases as can be seen by the portions enclosed with the dashed lines. In other words, in the portions enclosed with dashed lines, as the IOPS changes, the service time greatly changes. On the other hand, in portions other than those portions, it can be seen that the busy rate increases or decreases in proportion to the IOPS. For the portions where the busy rate increases or decreases in proportion to the IOPS in this way, it becomes possible to guarantee the bandwidth according to the IOPS from the relationship between the IOPS and the busy rate.

Figure 3:
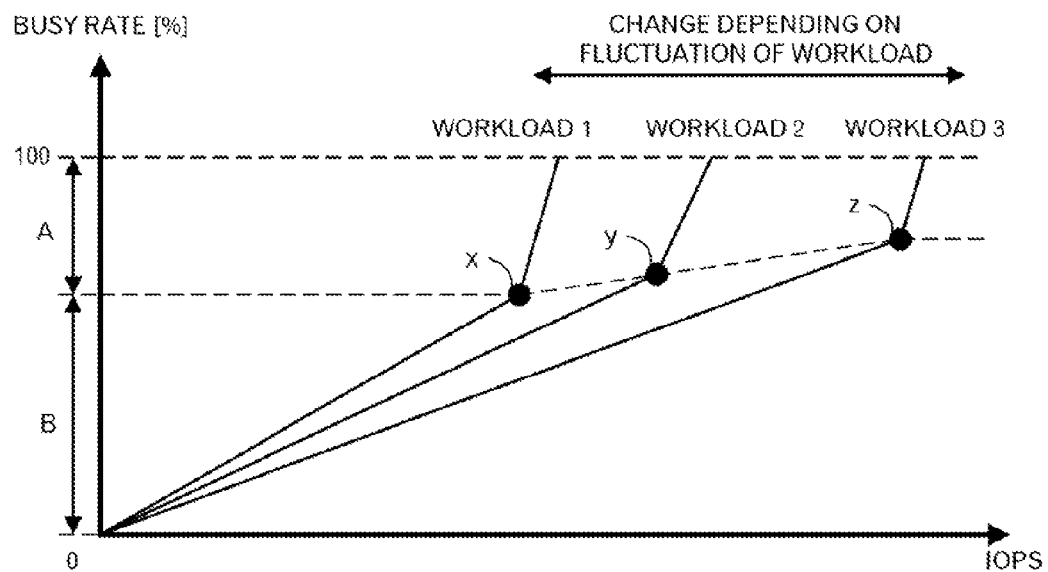
FIG. 3 is a diagram schematically depicting the relationship between IOPS and the busy rate.

FIG. 3 represents FIG. 1 more simply. As can be seen in FIG. 3, in any workload 1 to 3, there is a proportional limit busy rate x to z at the boundary between the portion B where the busy rate is linear with respect to the IOPS and the portion A where the busy rate is non-linear with respect to the IOPS. However, the actual workload begins to fluctuate as time passes, and at a certain time the workload is workload 1, and at a certain time the workload is workload 3, and furthermore, at a certain time the workload is workload 2, and the proportional limit busy rate fluctuates between x to z. Moreover, the proportional limit busy rate is not known in advance. Furthermore, here three workloads were illustrated, however there are multiple workloads, and which workload is loaded is known only as a result, and is not known beforehand. Therefore, even though at a certain point the busy rate is in a linear state with respect to the IOPS, as the workload changes as time passes, there is a possibility that the busy rate will unexpectedly exceed the proportional limit busy rate and become fixed at 100%. As a result, it is difficult to guarantee the bandwidth by using the IOPS.

Figure 4:
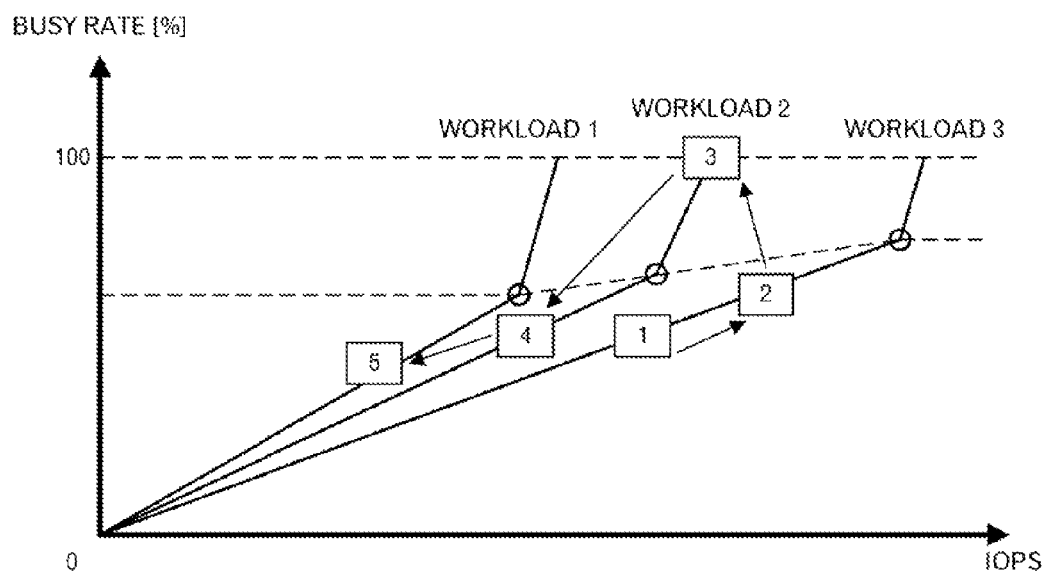
FIG. 4 is a diagram schematically depicting the relationship between IOPS and the busy rate.

More specifically, as illustrated in FIG. 4, points 1 to 5 (numbers enclosed in rectangles) are observed. In other words, when the combination of the IOPS and busy rate (point 2) is obtained at a second point in time after the combination of the IOPS and busy rate (point 1) is obtained at a first point in time, it can be seen that the combinations are in the linear section on the workload 3. However, next at the third point in time, a combination of the IOPS and busy rate "100%" (point 3) is obtained, so it is seen that the combination transitions from the workload 3 to another workload (here, this is workload 2). Here, after control is carried out to lower the IOPS, a combination of the IOPS and busy rate (point 4) is obtained at a fourth point in time. Time further passes, and a combination of the IOPS and busy rate (point 5) is obtained at a fifth point in time, and from the relationship between the IOPS and busy rate, it can be seen that the combination transitions from the workload 2 to another workload (here, this is the workload 1).

In this way, state data is merely obtained, discretely and when the busy rate is 100%, it is seen that the busy rate exceeds the proportional limit busy rate, however, the proportional limit busy rate itself is not known. When the busy rate is linear with respect to the IOPS, namely, in the linear section, it is possible to guarantee the bandwidth using the IOPS, however, as long as the proportional limit busy rate is not known, it is not possible to accurately know the linear section. Therefore, in this embodiment, the target busy rate is set so that 0<target busy rate≤proportional limit busy rate is satisfied, and control is performed so that the busy rate caused by the IO issued for the entire storage device is equal to or less than the target busy rate. However, the proportional limit busy rate changes according to the workload, so when a change in the workload is detected, the proportional limit busy rate is calculated again, and the target busy rate is also reset.

The control technique for setting the target busy rate and carrying out the guarantee of the bandwidth will be explained in detail.

Figure 5:
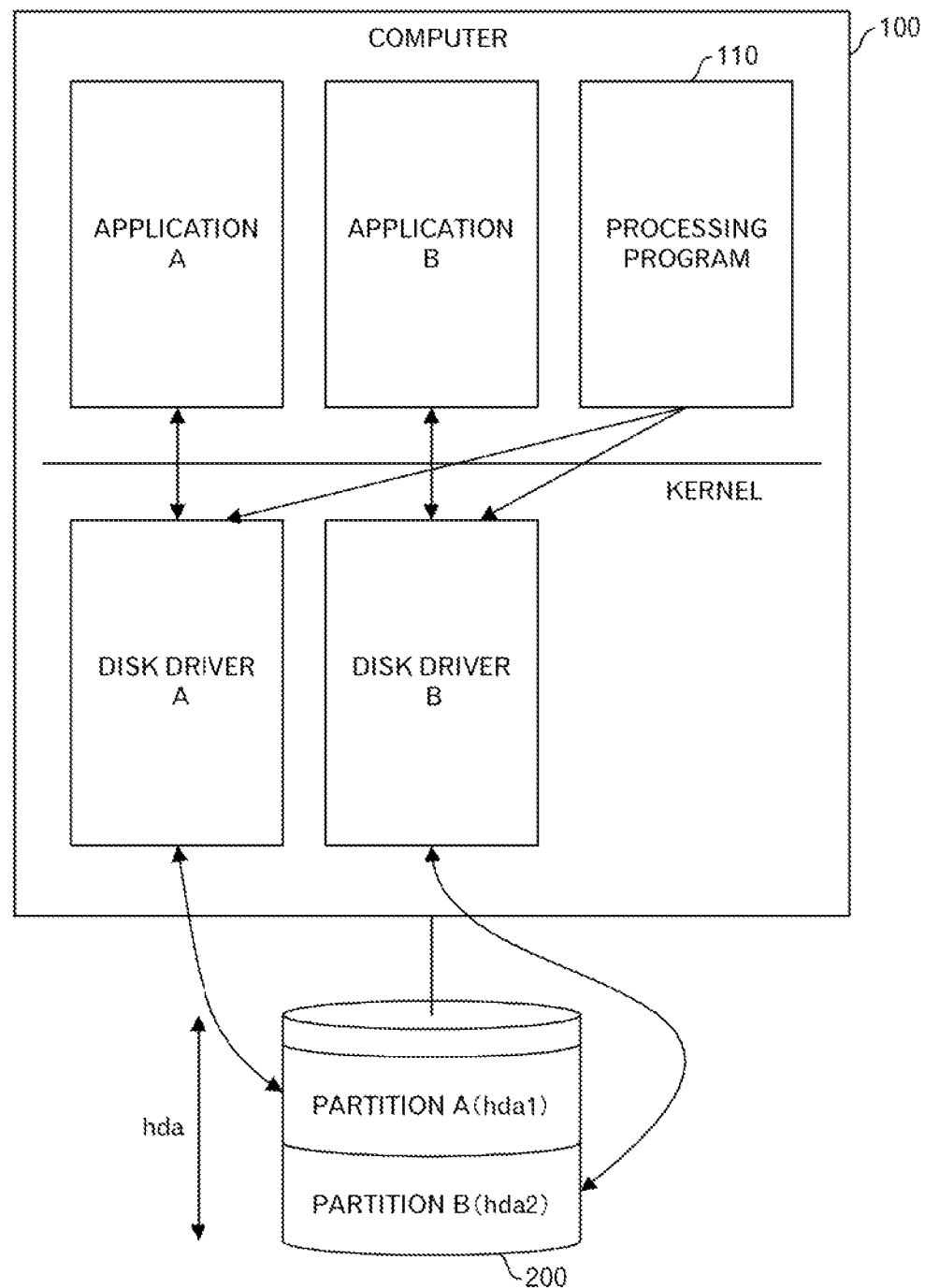
FIG. 5 is a diagram depicting a configuration of a computer in a first embodiment.

FIG. 5 illustrates a configuration of a computer relating to a first embodiment of this technique. The computer 100 illustrated in FIG. 5 is connected to a storage device 200, which is a hard disk (the name is hda) for example, and executes, in a kernel, a disk driver A for a partition A (the name is hda1) inside the storage device 200, and a disk driver B for a partition B (the name is hda2) inside the storage device 200. Moreover, the computer 100 executes applications A and B, where the application A accesses the partition A in the storage device 200 by way of the disk driver A, and the application B accesses the partition B in the storage device 200 by way of the disk driver B.

Furthermore, the computer 100 also executes a processing program 110, which is a daemon that carries out a processing for the bandwidth control that will be described in detail below.

In this embodiment, as will be explained in detail below, in order to guarantee the IO bandwidth by using the busy rate and the IOPS of the storage device 200, which correspond to the current IO status, the processing program 110 determines from the current busy rate, how the bandwidth control should be carried out, and instructs the disk driver to carry out the determined control. In the following, in order to make the explanation easier to understand, it will be presumed that the IO bandwidth is guaranteed for the application A.

Next, a processing executed by the processing program 110 illustrated in FIG. 1 will be explained using FIG. 6 to FIG. 11. The applications A and B, processing program 110 and disk drivers A and B are executed by a processor in the computer 100, and the functions described below are achieved.

Figure 6:
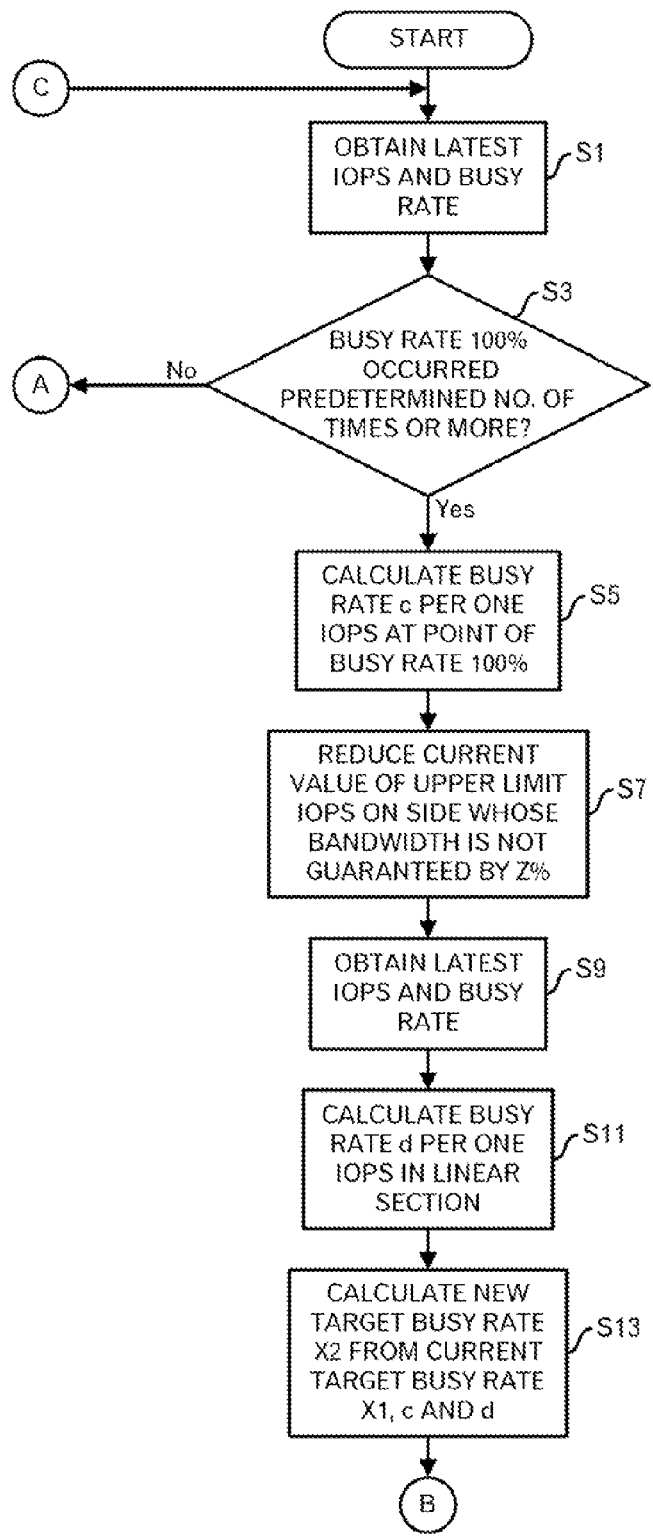
FIG. 6 is a diagram depicting a processing flow of a processing program in the first embodiment.

First, the processing program 110 acquires from the kernel the monitoring result, periodically such as per one minute, which includes the most recent IOPS and busy rate of the storage device 200, and stores the result in a storage device such as a main memory (FIG. 6: step S1).

For example, in the case of Linux (registered trademark), a command "iostat-x" is outputted to the kernel, and data such as illustrated in FIG. 7, for example, is acquired.

In the data illustrated in FIG. 7, the sum of the value r/s and the value w/s represents the IOPS, and the value of % util represents the busy rate.

Next, the processing program 110 determines, from the monitoring results of the most recent ten times, which include the monitoring result acquired at the step S1, whether the busy rate of 100% has occurred a predetermined number of times or more (for example, three times is preset) (step S3). When such a condition is satisfied, the processing program 110 determines that the workload has changed and an event for updating the target busy rate has occurred. On the other hand, when such a condition is not satisfied, the processing moves to step S20 in FIG. 9 via a terminal A.

When it is determined that an event for updating the target busy rate has occurred, the processing program 110 calculates the busy rate c per one IOPS from the value C of the IOPS in the monitoring results in which the busy rate is 100% using the relationship 100/C, and stores the result into the storage device such as the main memory (step S5). Plural values may be obtained for C, however, C may also be the average value or minimum value. In addition, the monitoring results of the recent ten times may be cleared at this stage.

Here, the values calculated in this processing flow will be explained using FIG. 8. The dashed line represents the relationship between the IOPS and the busy rate for the workload immediately before, and control is carried out to guarantee the bandwidth with this workload as a premise. However, after that, when point 11, where the busy rate becomes 100% when the IOPS is C, is detected a predetermined number of times, it is determined as described above that the workload has changed and an event for updating the target busy rate has occurred. At this time, the slope c of the straight line p in case where the non-linear section is expressed as a straight line is calculated at the step S5. However, the point q that corresponds to the proportional limit busy rate is not actually obtained.

Next, the processing program 110 instructs the disk driver B to reduce the present value of the upper limit IOPS on the side whose bandwidth is not guaranteed, by Z % (step S7). The processing executed by the disk driver will be explained later, however, the disk driver controls IO from an application so that the IOPS becomes equal to or less than the IOPS value notified from the processing program 110.

The point q that corresponds to the proportional limit busy rate is not actually obtained, however, IOPS is set so that the busy rate will be lower than that of the point q. Therefore, in order to obtain the point 12 where the busy rate becomes sufficiently lower than that of the point q, the disk driver B is notified of a value that is lower than the current value by an amount Z % (e.g. 20%), which is set experimentally.

After that, the processing program 110 acquires the monitoring result that includes the most recent IOPS and busy rate, and stores the result into the storage device such as the main memory (step S9). By doing so, the monitoring result at the point 12 in FIG. 8 is obtained. The processing program 110 then calculates the busy rate d per one IOPS for the linear section from the relationship {busy rate}/{most recent IOPS}, and stores the result into the storage device such as the main memory (step S11). In FIG. 8, the slope d of the straight line r is calculated.

After that, the processing program 110 calculates a new target busy rate X2 from the current target busy rate X1 and busy rates c and d per one IOPS, and stores the result in the storage device such as the main memory (step S13). More specifically, the new target busy rate X2 is calculated by the equation below.

$$X2=X1-(c-d)*C*y$$

Figure 8:
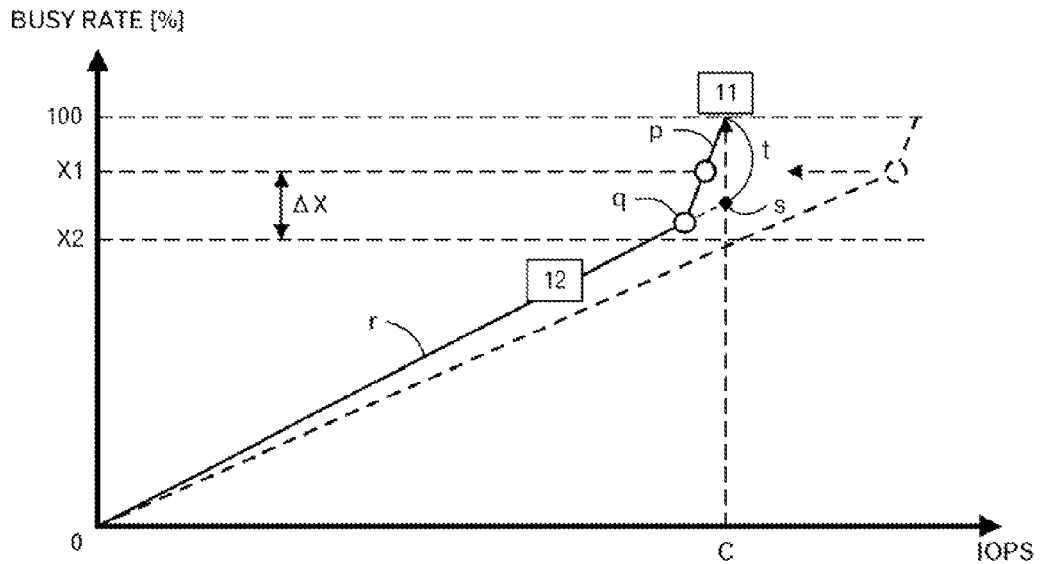
FIG. 8 is a diagram to explain a processing flow.

Here, $(c-d)*C$ represents the length (=difference in the busy rate) between the point 11 in FIG. 8 and a point s when the straight line r is extended to IOPS=C. In this embodiment, by setting the coefficient y (real number between 0 and 1) for $(c-d)*C$, the reduced width $\Delta X$ of the current target busy rate X1 is calculated. As for the value y, an appropriate value is also set from experimentation, however, when a greater value is set to y, a value that is much less than the actual proportional limit busy rate is set as the target busy rate. On the other hand, when a less value is set for y, a value that is greater than the actual proportional limit busy rate is set as the target busy rate, so the target busy rate has to soon be updated. Here, for example, y=0.5 is set. In this stage, the monitoring results for the most recent 10 times may be cleared at this stage.

Figure 9:
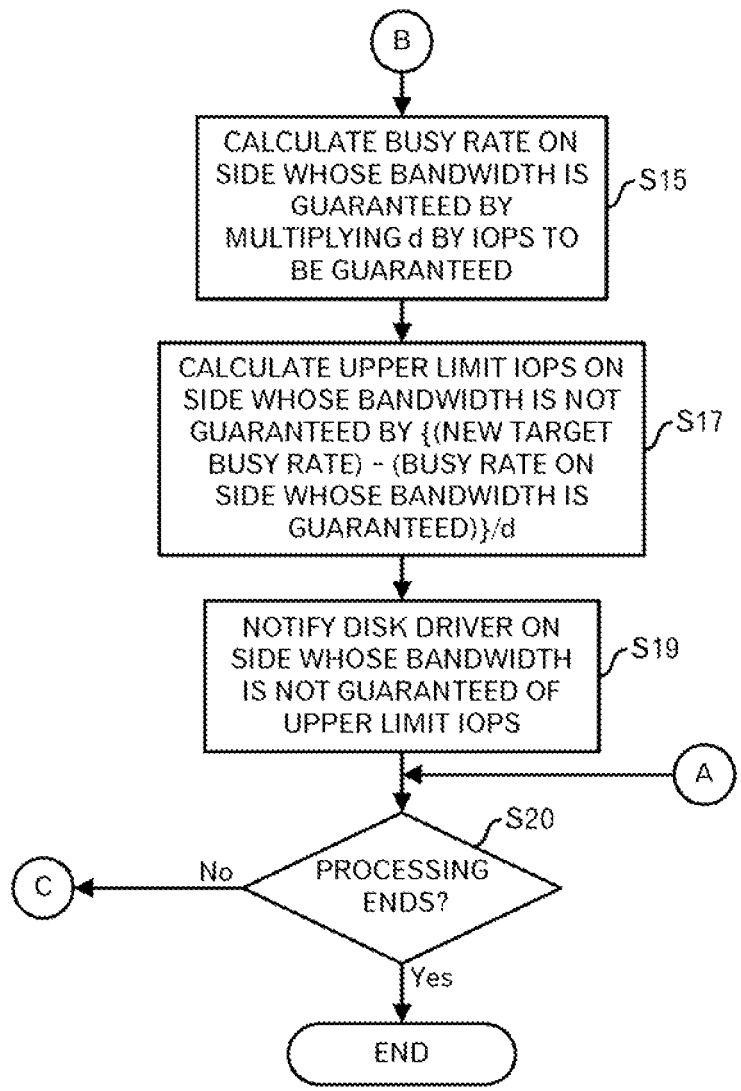
FIG. 9 is a diagram depicting a processing flow of the processing program in the first embodiment.

The processing then moves to the processing in FIG. 9 via a terminal B, and the processing program 110 multiplies d by the IOPS to be guaranteed for the application A to calculate the busy rate for the side whose bandwidth is guaranteed, and stores the result in the storage device such as the main memory (step S15). The value of the IOPS to be guaranteed is a value designated from the application A or from a user of the application A.

The value of the IOPS to be guaranteed may be too great. For example, when the busy rate is expressed as a %, the busy rate on the side whose bandwidth is guaranteed may exceed 100, or when the busy rate is expressed by a value between 0 and 1, the busy rate on the side whose bandwidth is guaranteed may exceed the value "1". Moreover, it is better to avoid a situation that the other applications cannot use the storage device 200. Therefore, a threshold value is set beforehand, and by determining whether the busy rate on the side whose bandwidth is guaranteed exceeds that threshold value, it is impossible to guarantee the IOPS when the busy rate exceeds the threshold value, and the processing described below may not be carried out, or a request for reducing the value of the IOPS to be guaranteed may be outputted. Moreover, the value of IOPS to be guaranteed may be automatically reduced in a range in which the IOPS to be guaranteed is secured.

Here, when d=0.7 [%/IOPS] is obtained for example, and the IOPS value to be guaranteed is 100, it can be seen that the busy rate becomes 0.7*100=70% in order to achieve the value of the IOPS to be guaranteed. In other words, when trying to ensure an IOPS value according to a request from the application A, a busy rate of 70% will be ensured.

After that, the processing program 110 calculates the upper limit IOPS on the side whose bandwidth is not guaranteed by calculating {(new target busy rate)−(busy rate on the side whose bandwidth is guaranteed)}/d, and stores the calculation result in the storage device such as the main memory (step S17).

In other words, the busy rate on the side whose bandwidth is not guaranteed is set so that the sum of the busy rate on the side whose bandwidth is guaranteed and the busy rate on the side whose bandwidth is not guaranteed matches the new target busy rate. In the linear section, the busy rate per one IOPS is d, so by dividing the busy rate on the side whose bandwidth is not guaranteed by d, the upper limit IOPS on the side whose bandwidth is not guaranteed is obtained.

For example, when the new target busy rate is 91, 70 is obtained as the busy rate on the side whose bandwidth is guaranteed at the step S15, and d=0.7 is obtained, (91−70)/0.7=30 is calculated as the upper limit IOPS on the side whose bandwidth is not guaranteed.

The processing program 110 then notifies the disk driver B on the side whose bandwidth is not guaranteed of the upper limit IOPS on the side whose bandwidth is not guaranteed (step S19). The disk driver B carries out the processing described below according to this notification.

After that, the processing program 110 determines whether an event has occurred to end the processing such as shutdown of the computer 100, or stopping of the processing program 110 (step S20). When the processing does not end, the processing returns to the step S1 in FIG. 6 via a terminal C. On the other hand, when an event occurred to end the processing, the processing ends.

By carrying out the processing as described above, it is possible to guarantee the IO performance by taking into consideration the busy rate that corresponds to the current IO status. Particularly, it is also possible to handle a case in which the workload changes.

Figure 10:
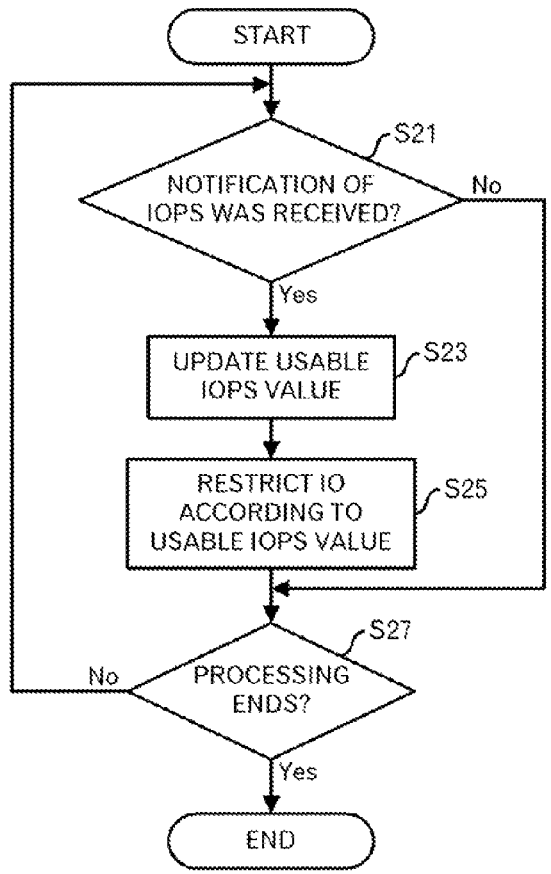
FIG. 10 is a diagram depicting a processing flow of a disk driver.

The disk driver carries out a processing as illustrated in FIG. 10. In the example described above, the disk driver B carries out the processing such as illustrated in FIG. 10. The disk driver determines whether an IOPS notification has been received from the processing program 110 (step S21). When the notification has not been received, the processing state is maintained, and the processing moves to step S27. However, when the IOPS notification has been received from the processing program 110, the disk driver updates the value of the IOPS that can be used by the disk driver itself with the notified IOPS (step S23). In the example described above, the disk driver B is notified of the 30 IOPS, so the value of the IOPS that is usable by disk driver B is updated to the 30 IOPS.

The disk driver then restricts the IO according to the usable IOPS (step S25). For example, after 30 IO per second have been processed, the IO is restricted by blocking the IO so that even at a maximum the IOPS is 30. As a result, the overall IOPS is controlled so that it is equal to or less than the IOPS that corresponds to the target busy rate. The processing described above is repeated until the processing ends (step S27).

By carrying out the processing as described above, the IO is restricted for partitions on the side whose bandwidth is not guaranteed, and the IO is processed with no restrictions for partitions on the side whose bandwidth is guaranteed, so as a result, the designated IOPS to be guaranteed is achieved.

In the processing flow in FIG. 6 and FIG. 9, for the new target busy rate, a processing is carried out to subtract ΔX from the previous value. Therefore, a processing as described below is carried out to return the target busy rate to the initial value.

Figure 11:
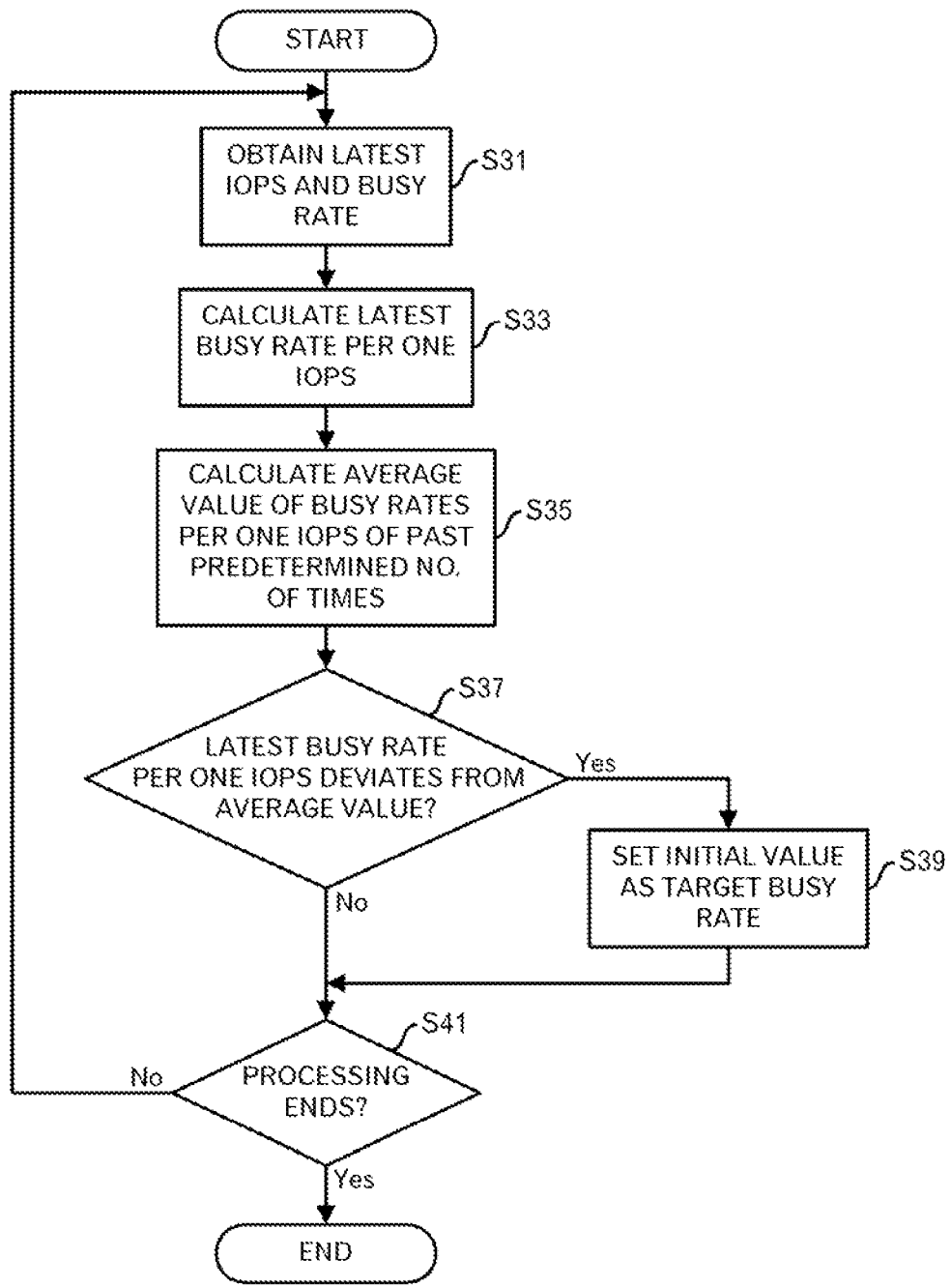
FIG. 11 is a diagram depicting a processing flow of an update processing of a target busy rate.

More specifically, the processing program 110 acquires the monitoring result that includes the most recent IOPS and busy rate, and stores the result in the storage device such as the main memory (FIG. 11: step S31). After that, the processing program 110 calculates the most recent busy rate per one IOPS using the relationship (busy rate)/IOPS, and stores the result in the storage device such as the main memory (step S33). Moreover, the processing program 110 calculates the average value of the busy rates per one IOPS for the past predetermined number of times (for example, 10 times), and stores the result in the storage device such as the main memory (step S35). Using the monitoring results for the past predetermined number of times, which are stored in the storage device such as the main memory, the processing program 110 calculates the average value of the busy rates per one IOPS.

After doing so, the processing program 110 determines whether the most recent busy rate per one IOPS has deviated a predetermined level or greater from the average value calculated at the step S35 (step S37). For example, the processing program 110 determines whether the most recent busy rate per one IOPS has deviated N % (for example, 20%) or a difference between the most recent busy rate and the average value has deviated N or more (for example, 10). When the deviation is a predetermined level or greater, the processing program 110 sets the initial value to the target busy rate X (step S39). For example, in the case of the observation such as illustrated in FIG. 8, X=95 is set as the busy rate X (or when "1" is the upper limit, X=0.95). Furthermore, the monitoring results for the past 10 times are cleared.

When the most recent busy rate per one IOPS does not deviate from the average value by a predetermined level or more, or after the step S39, the processing program 110 determines whether an event has occurred to end the processing (step S41). When an event to end the processing has not occurred, the processing returns to the step S31. However, when an event to end the processing has occurred, the processing ends.

In this way, when the busy rate per one IOPS greatly fluctuates, the target busy rate is initialized in order to readjust the target busy rate.

Embodiment 2

In the first embodiment, an example was explained in which there were two partitions in the storage device 200, and the application A, whose bandwidth is to be guaranteed, accesses the partition A, and the application B, whose bandwidth does not need to be guaranteed, accesses the partition B, however, there is a case where there are plural applications whose bandwidth is to be guaranteed. In this embodiment, the case where the bandwidth is guaranteed for more than one application is explained.

Figure 12:
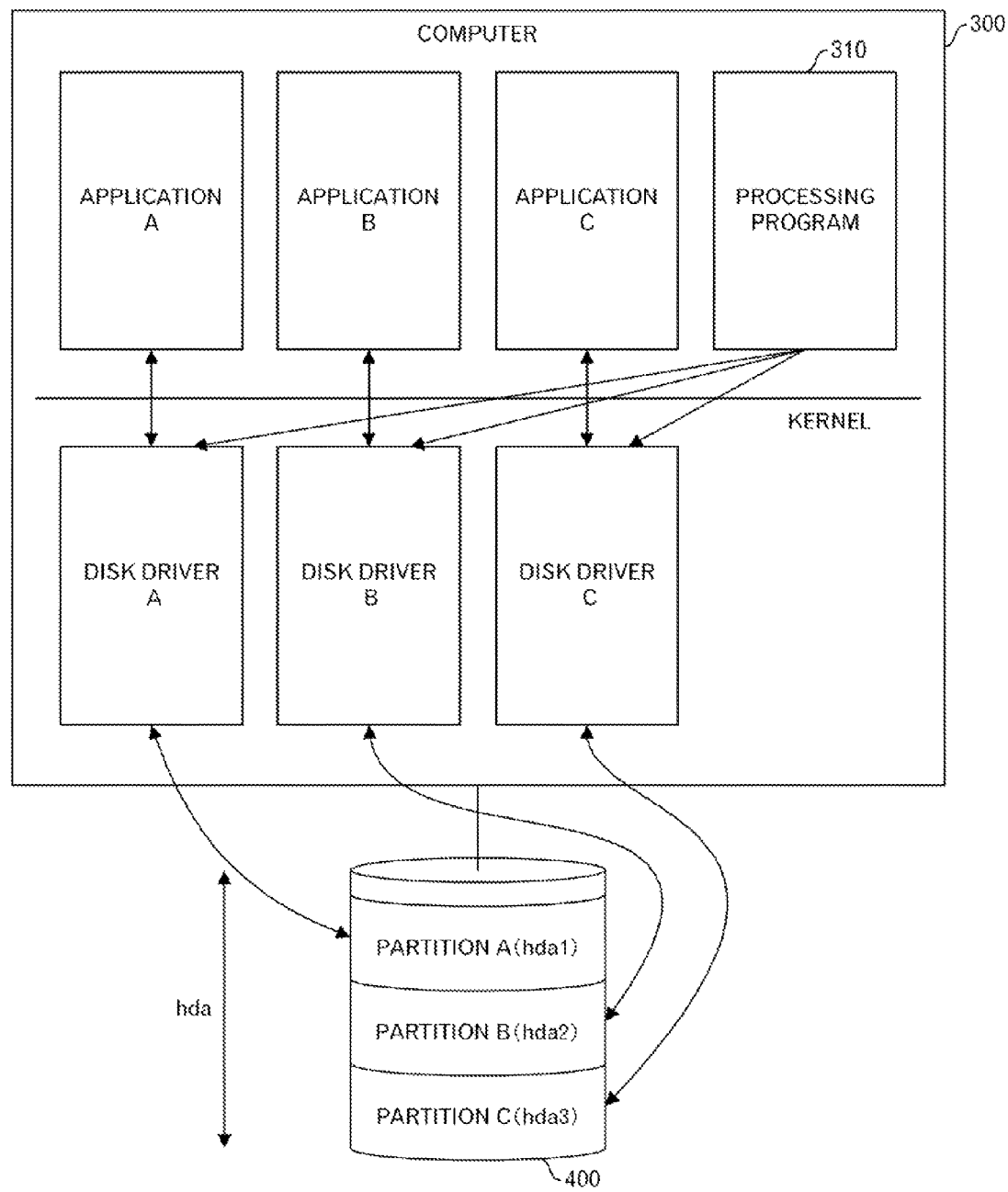
FIG. 12 is a diagram depicting a configuration of a computer in a second embodiment.

FIG. 12 illustrates a configuration of a computer relating to this embodiment. The computer 300 illustrated in FIG. 12 is connected to a storage device 400, which, for example, is a hard disk (the name is hda), and executes, in a kernel, a driver A for a partition A (name is hda1) in the storage device 400, disk driver B for a partition B (name is hda2) in the storage device 400, and disk driver C for a partition C (name is hda3) in the storage device 400. Moreover, it is presumed that the computer 300 executes the applications A to C, and the application A accesses the partition A in the storage device 400 by way of the disk driver A, the application B accesses the partition B in the storage device 400 by way of the disk driver B, and the application C accesses the partition C in the storage device 400 by way of the disk driver C.

Moreover, the computer 300 also executes a processing program 310 that is a daemon for carrying out a processing to control the bandwidth, which will be explained later in detail.

In this embodiment, as will be explained in detail below, the processing program 310 determines, from the busy rate and IOPS of the storage device 400, which correspond to the current access status, how the bandwidth control is carried out in accordance with the current busy rate in order to guarantee the IO performance. In this embodiment, it is presumed that the IO bandwidth is guaranteed for the applications A and B.

Figure 13:
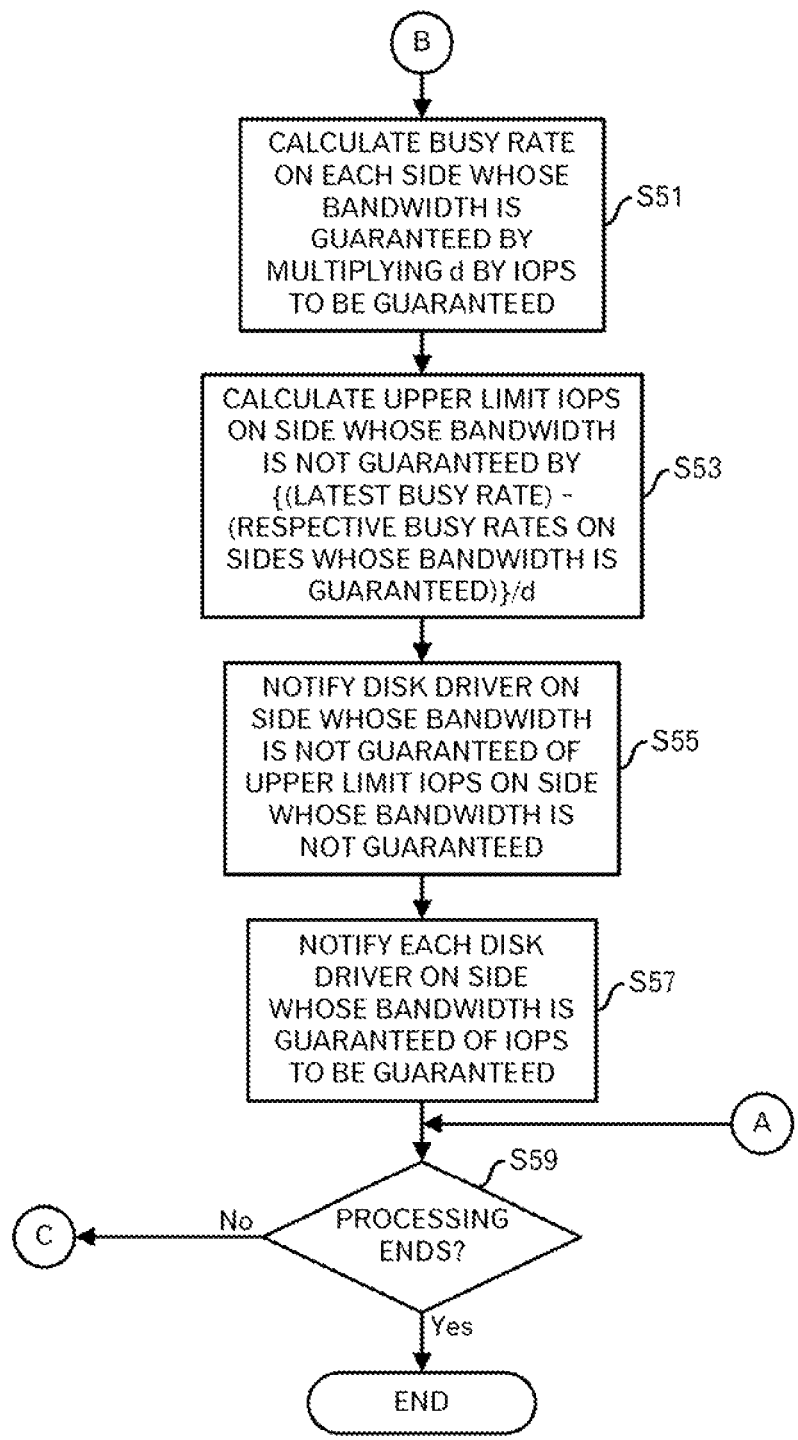
FIG. 13 is a diagram depicting a processing flow of a processing program in the second embodiment.

Next, the processing by the processing program 310 illustrated in FIG. 12 will be explained using FIG. 13. However, the processing in FIG. 6 that was explained for the first embodiment is the same, so an explanation is omitted here. In other words, the processing moves to the processing in FIG. 13 by way of the terminal B, and the processing program 310 calculates the busy rate on each side whose bandwidth is guaranteed by multiplying d by each IOPS to be guaranteed, and stores the results in the storage device such as the main memory (step S51). Together with calculating the busy rate for the application A by multiplying d by the IOPS to be guaranteed for the application A, the processing program 310 also calculates the busy rate for the application B by multiplying d by the IOPS to be guaranteed for the application B. The IOPS value to be guaranteed is a value designated by the application or the user of the application. The case where the IOPS to be guaranteed is too great is handled in the same way as in the first embodiment.

Here, for example, when it is presumed that d=0.7 [%/IOPS] is obtained, the value of the IOPS to be guaranteed for the application A is 60, and the value of the IOPS to be guaranteed for the application B is 40, it can be seen that, in order to achieve the IOPS value to be guaranteed for the application A, the busy rate becomes 0.7*60=42%, and in order to achieve the IOPS value to be guaranteed for the application B, the busy rate becomes 0.7*40=28%. In other words, when trying to guarantee the IOPS value according to a request from the application A, a busy rate of 42% is secured, and when trying to guarantee the IOPS value according to a request from the application B, a busy rate of 28% is ensured.

After that, the processing program 310 calculates the upper limit IOPS on the side whose bandwidth is not guaranteed by the relationship {(new target busy rate)−(respective busy rates for respective sides whose bandwidth is guaranteed)}/d, and stores the results in the storage device such as the main memory (step S53).

In other words, the busy rate on the side whose bandwidth is not guaranteed is set so that the sum of the respective busy rates on each side whose bandwidth is guaranteed and the busy rate on the side whose bandwidth is not guaranteed matches the new target busy rate. In the linear section, the busy rate per one IOPS is d, so by dividing the busy rate on the side whose bandwidth is not guaranteed by d, the upper limit IOPS of the side whose bandwidth is not guaranteed is obtained.

For example, when the new target busy rates 91, 42 and 28 are obtained as the busy rates for the respective sides whose bandwidth is guaranteed at the step S51, and when d=0.7, (91−(42+28))/0.7=30 is calculated as the upper limit IOPS on the side whose bandwidth is not guaranteed.

The processing program 310 then notifies the disk driver C on the side whose bandwidth is not guaranteed of the upper limit IOPS for the side whose bandwidth is not guaranteed (step S55). The disk driver C carries out the processing in FIG. 10 according to the notification.

Moreover, the processing program 310 notifies each disk driver on the side whose bandwidth is guaranteed of the IOPS to be guaranteed (step S57). The disk drivers A and B carry out the processing in FIG. 10 according to the notification.

After that, the processing program 310 determines whether an event to end the processing, such as shutdown of the computer 300 or stopping of the processing program 310, has occurred (step S59). When an event to end the processing has not occurred, the processing returns to the step S1 in FIG. 6 by way of the terminal C. On the other hand, when an event to end the processing has occurred, the processing ends.

By performing the processing as described above, and taking into consideration the busy rate according to the current IO occurrence state, it is possible to guarantee the bandwidth even when there is more than one application for which the bandwidth is to be guaranteed. Particularly, even a case in which the workload changes can be handled.

Moreover, in the aforementioned example, there is only one partition whose bandwidth is not guaranteed based on IOPS, however, even in the case where there is more than one partition whose bandwidth is not guaranteed, the notification is carried out for the disk driver of each partition. When doing this processing, various variations can be considered for how to determine the IOPS value for each partition whose bandwidth is not guaranteed, however, for example, they may be equal, or an inclined allotment may be made based on the priority settings for the partitions whose bandwidth is not guaranteed.

Although the embodiments of this technique were explained above, this technique is not limited to those embodiments. For example, in case where the disk driver can identify the application, even when the partition is shared with plural applications, it becomes possible to guarantee the bandwidth by calculating the upper limit IOPS of the application whose bandwidth is not guaranteed, according to the aforementioned method.

In addition, when plural storage devices exist, the aforementioned processing is carried out for each storage device.

Figure 14:
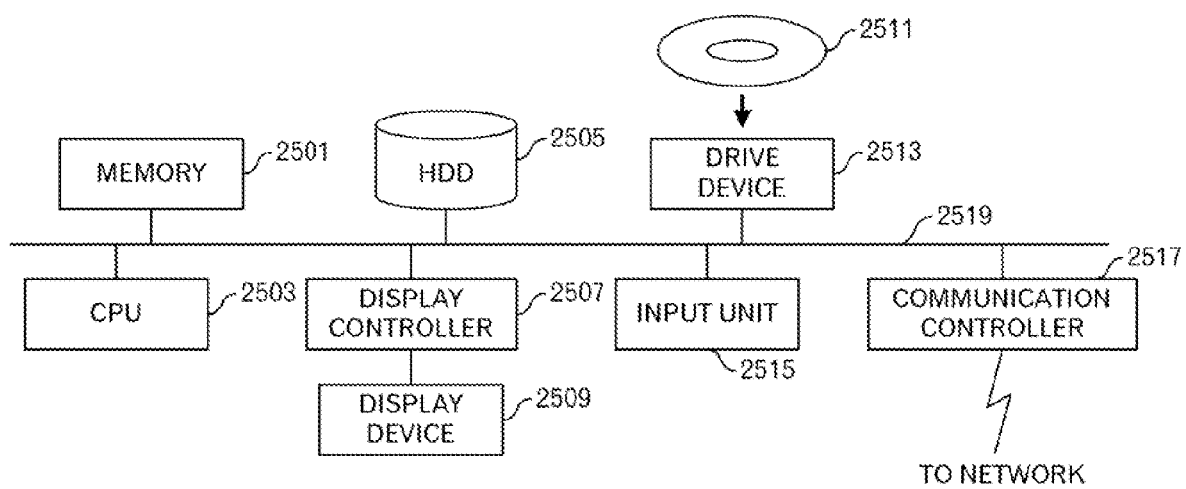
FIG. 14 is a functional block diagram of a computer.

In addition, the aforementioned computer 100 and computer 300 are computer devices as illustrated in FIG. 14. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 14. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

A control method according to the embodiments includes: (A) obtaining a first monitoring result concerning a busy rate and the number of accesses per unit time with respect to a storage device including a first storage area and a second storage area; (B) determining, from the obtained first monitoring result, whether or not an event that a first indicator value for the busy rate is reset occurs; (C) upon determining that the event occurred, notifying a controller that makes the number of accesses per unit time for the second storage area equal to or less than the notified number of accesses of the first number of accesses per unit time, which is less than the second number of accesses per unit time, which was notified immediately before; (D) obtaining a second monitoring result concerning the busy rate and the number of accesses per unit time; (E) updating the first indicator value based on at least the obtained Second monitoring result; (F) calculating the third number of accesses per unit time based on the obtained second monitoring result so that a sum of a busy rate corresponding to the third number of accesses per unit time and a busy rate corresponding to the designated number of accesses per unit time becomes equal to the updated first indicator value; and (G) notifying the controller of the calculated third number of accesses per unit time.

By carrying out such a processing, even when the occurrence status of the IOs changed and the present control mode cannot continue, it is possible to dynamically guarantee the bandwidth of the IOs, because the number of accesses per unit time is controlled by at least the controller for a storage area whose bandwidth is not guaranteed, in a mode corresponding to the occurrence status of the current IOs.

Moreover, in the control method according to the embodiments, the first storage area may include plural storage areas, and the number of accesses per unit time may be designated for each of the plural storage areas. In such a case, this control method may further include: (H) instructing a controller for each of the plurality of storage areas so as to limit, for each of the plural storage area, the number of accesses per unit time to the designated number of accesses per unit time. Thus, it becomes possible to cope with a case where the storage device includes three or more storage areas.

In addition, the determining may include: determining whether or not the number of times that the busy rate reached an upper limit value reaches the predetermined number of times.

Furthermore, the aforementioned updating may include: lowering the first indicator value by a value obtained by multiplying the number of accesses per unit time when the busy rate reached an upper limit value, a predetermined coefficient and a difference between a value obtained by dividing the upper limit value of the busy rate by the number of accesses per unit time when the busy rate reached the upper limit value and a value obtained by dividing the busy rate of the second monitoring result by the number of accesses per unit time of the second monitoring result. By adjusting the predetermined coefficient, it becomes possible to bring the first indicator value closer to the theoretical upper limit value (proportional limit busy rate in the embodiments) of the first indicator value. However, the first indicator value may be updated by using other methods.

Moreover, the control method according to the embodiments may further include: (I) obtaining a third monitoring result concerning the busy rate and the number of accesses per unit time with respect to the storage device; and (J) upon detecting that a difference between a second indicator value for the busy rate, which is calculated from the obtained third monitoring result, and an average value of past values of the second indicator is equal to or greater than a predetermined value, returning the first indicator value to an initial value. It becomes possible to set the first indicator value, more properly.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process comprising:
   obtaining, at a first timing, a first busy rate and a first number of accesses per unit time with respect to a storage device including a first storage area and a second storage area;
   determining whether or not an event occurred that a first indicator value relating to a busy rate is to be updated;
   upon determining that the event occurred, notifying a controller of a lowered number of accesses per unit time than a current number of accesses per unit time, wherein the controller makes the current number of accesses per unit time for the second storage area equal to or less than the notified lowered number of accesses per unit time;
   obtaining, at a second timing after the notifying, a second busy rate and a second number of accesses per unit time;
   updating the first indicator value based on at least the second busy rate and the second number of accesses per unit time;
   first calculating a third number of accesses per unit time for the second storage area, so that a sum of a third busy rate corresponding to the third number of accesses per unit time for the second storage area and a fourth busy rate calculated from a designated number of accesses per unit time for the first storage area becomes equal to the updated first indicator value; and
   notifying the controller of the calculated third number of accesses per unit time.

2. The computer-readable, non-transitory storage medium as set forth in claim 1, wherein the first storage area includes a plurality of storage areas, and the designated number of accesses per unit time is designated for each of the plurality of storage areas, and
   the process further comprises:
   instructing a controller for each of the plurality of storage areas so as to limit, for each of the plurality of storage area, a number of accesses per unit time to the designated number of accesses per unit time.

3. The computer-readable, non-transitory storage medium as set forth in claim 1, wherein the determining comprises determining whether or not a number of times that the first busy rate reached an upper limit value reaches a predetermined number of times.

4. The computer-readable, non-transitory storage medium as set forth in claim 1, wherein the updating comprises subtracting, from the first indicator value, a value obtained by multiplying a fourth number of accesses per unit time when the first busy rate reached an upper limit value, a predetermined coefficient and a difference between a value obtained by dividing the upper limit value by the fourth number of accesses per unit time and a value obtained by dividing the second busy rate by the second number of accesses per unit time.

5. The computer-readable, non-transitory storage medium as set forth in claim 4, wherein the process further comprises:
   obtaining a third busy rate and a fourth number of accesses per unit time with respect to the storage device; and
   upon detecting that a difference between a second indicator value relating to the busy rate, which is calculated from the obtained third busy rate and third number of access per unit time, and an average value of past values of the second indicator is equal to or greater than a predetermined value, returning the first indicator value to an initial value.

6. A control method, comprising:
   obtaining, at a first tinning, a first busy rate and a first number of accesses per unit time with respect to a storage device including a first storage area and a second storage area;
   determining whether or not an event occurred that a first indicator value relating to a busy rate is to be updated;
   upon determining that the event occurred, notifying a controller of a lowered number of accesses per unit time than a current number of accesses per unit time, wherein the controller makes the current number of accesses per unit time for the second storage area equal to or less than the notified lowered number of accesses per unit time;

obtaining, at a second timing after the notifying, a second busy rate and a second number of accesses per unit time;

updating the first indicator value based on at least the second busy rate and the second number of accesses per unit time;

calculating a third number of accesses per unit time for the second storage area so that a sum of a third busy rate corresponding to the third number of accesses per unit time for the second storage area and a fourth busy rate calculated from a designated number of accesses per unit time for the first storage area becomes equal to the updated first indicator value; and notifying the controller of the calculated third number of accesses per unit time.

7. A computer, comprising:

a storage device including a first storage area and a second storage area;

a controller for the second storage area in the storage device equal; and a processing unit, and wherein the processing unit executes a process comprising:

obtaining a first busy rate and a first number of accesses per unit time with respect to the storage device;

determining whether or not an event occurred that a first indicator value relating to a busy rate is to be updated;

upon determining that the event occurred, notifying the controller of a lowered number of accesses per unit time than a current number of accesses per unit time, wherein the controller makes the current number of accesses per unit time for the second storage area equal to or less than the notified lowered number of accesses per unit time;

obtaining, at a second timing after the notifying, a second busy rate and a second number of accesses per unit time;

updating the first indicator value based on at least the second busy rate and the second number of accesses per unit time;

calculating a third number of accesses per unit time for the second storage area so that a sum of a third busy rate corresponding to the third number of accesses per unit time for the second storage area and a fourth busy rate calculated from a designated number of accesses per unit time for the first storage area becomes equal to the updated first indicator value; and notifying the controller of the calculated third number of accesses per unit time.

8. The computer-readable, non-transitory storage medium as set forth in claim 1, wherein the process further comprises:

second calculating a fifth busy rate by dividing the second busy rate by the second number of accesses per unit per unit time, and the first calculating comprises:

calculating the third number of accesses per unit time by dividing a difference between the updated first indicator value and the second busy rate by the fifth busy rate.

* * * * *